J. J. HOGAN.
DETACHABLE MACHINE COUPLING.
APPLICATION FILED AUG. 31, 1920.
1,413,119.
Patented Apr. 18, 1922.
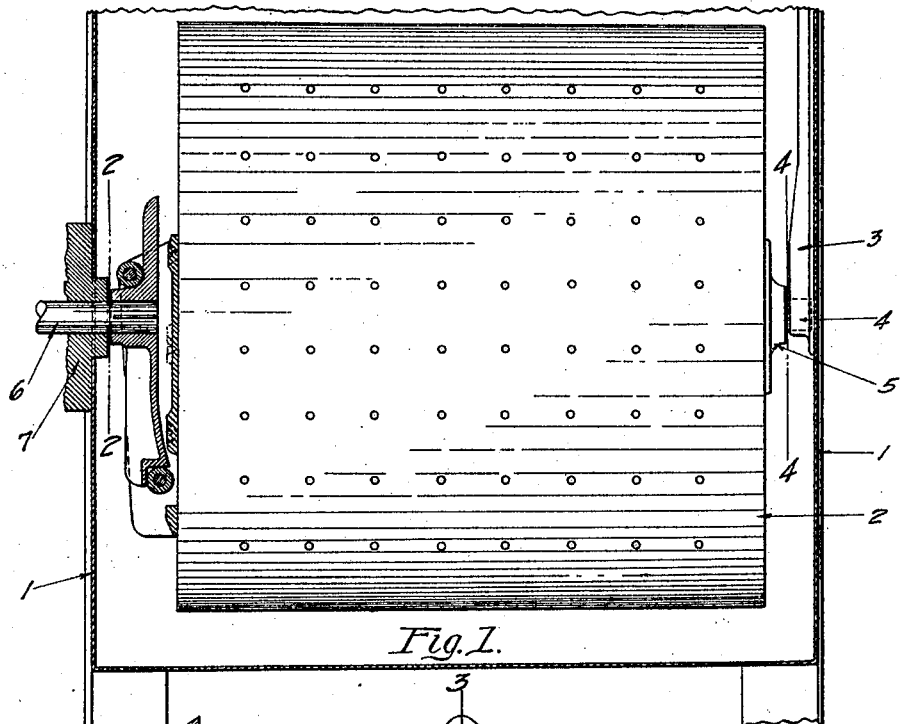
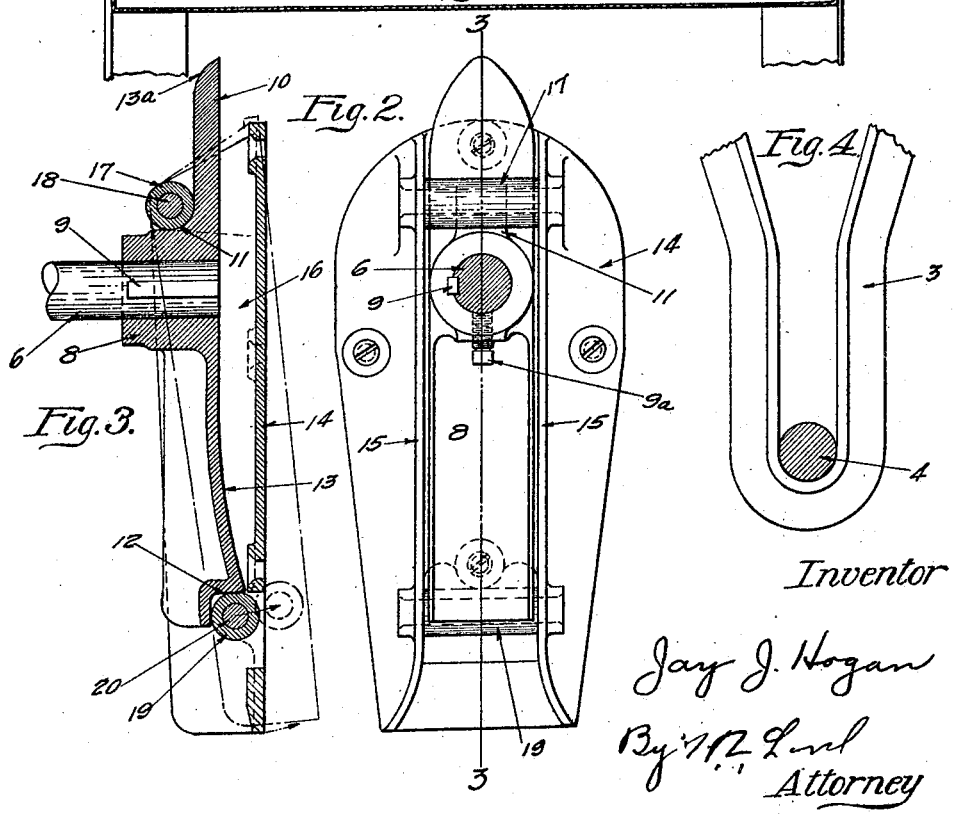
Inventor
Jay J. Hogan
By * *
Attorney

UNITED STATES PATENT OFFICE.

JAY J. HOGAN, OF ERIE, PENNSYLVANIA, ASSIGNOR TO HOGAN-SPENCER-WHITLEY COMPANY, OF ERIE, PENNSYLVANIA, A CORPORATION OF PENNSYLVANIA.

DETACHABLE MACHINE COUPLING.

1,413,119.  Specification of Letters Patent.  Patented Apr. 18, 1922.

Application filed August 31, 1920. Serial No. 407,139.

*To all whom it may concern:*

Be it known that I, JAY J. HOGAN, a citizen of the United States, residing at Erie, in the county of Erie and State of Pennsylvania, have invented new and useful Improvements in Detachable Machine Couplings, of which the following is a specification.

It is desirable in washing machines having a rotary cylinder operating in a receptacle to be able to readily remove the cylinder from the receptacle and in order that this may be done it is necessary to provide a driving means for the cylinder which will permit of such removal of the cylinder and yet will so engage the cylinder when it is operating as to drive it and hold it in place. With the present detachable machine coupling this may be accomplished.

The invention is illustrated in the accompanying drawings as follows:—

Fig. 1 shows a central section of the washer.

Fig. 2 shows a section on the line 2—2 in Fig. 1.

Fig. 3 shows a section on the line 3—3 in Fig. 2.

Fig. 4 shows a section on the line 4—4 in Fig. 1.

1 marks the tub or receptacle, and 2 the cylinder, 3 an open bearing for the free end of the cylinder. This bearing is formed by a simple loop or angle iron. A stud 4 is secured by means of a plate 5 on the end of the cylinder and rests in the open bearing 3.

The drive shaft 6 is driven from any convenient source of power and operates in a bearing 7 arranged in the end of the tub 1. A driving arm 8 is locked on the shaft 6 by means of a key 9 and set screw 9ª. The arm is provided with the shoulders 11 and 12 and cam surfaces 13 and 13ª. A plate 14 is secured to the end of the cylinder and is provided with the radially arranged ribs 15 which form a groove 16 adapted to receive the arm 8. A roller 17 is journaled on a pin 18, the pin being secured to and between the ribs 15. A roller 19 is journaled on a pin 20. This pin is also secured between the ribs 15 and being offset in an axial direction from the roller 17.

In order to place the cylinder in the tub the arm 8 is turned so as to bring the point for cam surface 13ª to the top. The cylinder is then lowered into the tub hooking the roller 17 over the point onto the cam 13ª. The weight of the cylinder itself will complete the engagement as the cylinder slides down by gravity on the arm 8, the roller 19 moving along the cam 13 swings the lower side of the cylinder outwardly from the arm, thus tilting the cylinder as a whole upwardly until the roller 19 drops under the shoulder 12. This permits the cylinder to move down to alinement with the shaft 6 with the stud 4 in the bearing 3. In this position it will be observed the cylinder is locked to rotate with the shaft 6 by reason of the engagement of the arm 8 with the walls of the groove 16. The shoulder 12 operating on the roller 19 prevents the disengagement of the cylinder when the shoulder is in the upper position and the roller 17 resting on the shoulder 11 prevents the dropping down of the cylinder when the roller 17 is in the upper position.

To disengage the cylinder all that is necessary is to tilt the free end of the cylinder, that is, the end having the stud 4 sufficiently to carry the roller 19 out from under the shoulder 12. The cylinder may then be drawn upwardly and disengaged.

The rollers form a very important feature of this invention in that without them the frictional engagement of the members would hold the cylinder from sliding down to place if released because the frictional engagement due to the overhanging of the cylinder would be greater than the downward force incident to the weight of the cylinder. The rollers relieve this friction so that the cylinder when released immediately slides into place. This is very essential because the operators of this type of device are not skilled and if it were possible for the cylinder to lodge before reaching its final position there would be danger of breaking the machine.

What I claim as new is:—

1. In a detachable machine coupling, the combination of a cylinder; a drive shaft; and a detachable driving connection between the cylinder and shaft comprising interlocking members on which the cylinder may be hung and along which the cylinder may move to locking position with the cylinder in alinement with the shaft and roller bearings between the locking members reducing the friction due to the overhanging of the cylinder to less than the gravity pressure of the cylinder whereby when the interlocking members are placed in engagement and the cylinder released the cylinder will move to locking position through the action of gravity.

2. In a detachable machine coupling, the combination of a driven element in the form of a cylinder; a driving element in the form of a drive shaft; and a detachable driving connection between said elements comprising a radially extending groove; an arm on the shaft engaging the wall of the groove and adapted to enter therein by a tilting of the cylinder; roller bearings for the engaging surfaces subjected to the overhanging pressure of the cylinder assuring the completion of the entering movement of the arm into the groove through the weight of the cylinder; and shoulders preventing the disengagement of the connection with the shaft and cylinder in alinement.

3. In a detachable machine coupling, the combination of a cylinder; a drive shaft; and a driving connection between the cylinder and the drive shaft comprising interlocking members, said interlocking members having rollers, cam surfaces and locking shoulders, the cam surfaces engaging the rollers with the cylinder offset from the axis and guiding the cylinder when released into locking position, the shoulders preventing disengagement when the cylinder is in alinement with the shaft.

4. In a detachable machine coupling, the combination of a cylinder; a drive shaft; and a detachable driving connection between the cylinder and shaft comprising interlocking members having rollers, cam surfaces and locking shoulders, the cam surfaces engaging the rollers with the cylinder off-set from the axis and with the axis of the cylinder approximately parallel with the shaft and guiding the cylinder when released into locking position, the cam surfaces first tilting the cylinder as it moves toward locking position and the cylinder dropping to alinement with the shaft to bring the shoulders into locking position, the shoulders preventing the disengagement of the cylinder from the shaft when the cylinder is in alinement with the shaft.

5. In a detachable machine coupling, the combination of a cylinder; a drive shaft; and a detachable driving connection between the cylinder and the shaft comprising interlocking members, said interlocking members having rollers, cam surfaces and locking shoulders, the cam surfaces engaging the rollers with the cylinder off-set from the axis of the shaft and with the axis of the cylinder approximately parallel with the axis of the shaft, said surfaces and rollers guiding the cylinder when released to first move the cylinder into a tilted position and then into locking position in alinement with the shaft 6. In a detachable machine coupling, the combination of a cylinder; a drive shaft; and a detachable driving connection between the cylinder and the shaft comprising interlocking members, said interlocking members having rollers, cam surfaces and locking shoulders, the cam surfaces engaging the rollers with the cylinder off-set from the axis of the shaft and with the axis of the cylinder approximately parallel with the axis of the shaft, said surfaces and rollers guiding the cylinder when released to first move the cylinder into a tilted position and then into locking position in alinement with the shaft, whereby the cylinder may be placed in the initial position with the members in engagement and will pass to locking position through gravity.

7. In a detachable machine coupling, the combination of a cylinder; a drive shaft; and a detachable connection between the drive shaft and cylinder comprising interlocking members, one of the members having ribs forming a radial groove and rollers extending across the groove and the other member having a driving arm adapted to enter the groove under one roller and over another roller whereby the cylinder may be hung on the connection with its axis off set and will drop to place.

8. In a detachable machine coupling, the combination of a cylinder; a drive shaft; and a detachable connection between the drive shaft and cylinder comprising interlocking members, one of the members having ribs forming a radial groove and rollers extending across the groove and the other member having a driving arm adapted to enter the groove under one roller and over another roller whereby the cylinder may be hung on the connection with its axis off set and will drop to place, said arm having locking shoulders adapted to engage the rollers when the cylinder is in alinement with the shaft to prevent the disengagement of the cylinder while in alinement.

9. In a detachable machine coupling, the combination of a cylinder; a drive shaft; and a detachable connection between the drive shaft and cylinder comprising interlocking members, one of the members having ribs forming a radial groove and rollers extending across the groove and the other member having a driving arm adapted to enter the groove under one roller and over another roller whereby the cylinder may be hung on the connection with its axis offset and will drop to place, said arm having cam surfaces operating on the rollers to tilt the cylinder as it rolls along the cam surfaces, said arm having shoulders engaging the rollers when the cylinder drops to alinement to prevent the disengagement of the cylinder while in alinement.

10. In a detachable machine coupling, the combination of a cylinder; a drive shaft; a driving connection between the shaft and cylinder comprising interlocking members, the member on the cylinder being formed by a driving groove and rollers extending across the groove, said rollers being off-set axially, the other member being mounted on the shaft and comprising an arm adapted to enter said groove with one end under one of the rollers, said arm having a cam surface engaging the other of the rollers whereby the cylinder may be hung on and when released will move down the arm with one roller at one side of the arm and the other roller at the opposite side of the arm, said arm having guiding surfaces effecting a tilting of the cylinder; a shoulder on the arm which is engaged by the roller under which the arm is placed when the cylinder reaches alinement with the shaft; and a second shoulder on the arm under which the second roller drops as the cylinder moves to alinement whereby if the cylinder is hung on the arm and released it will move into locking position by gravity.

In testimony whereof I have hereunto set my hand.

JAY J. HOGAN,